United States Patent [19]

Linder

[11] Patent Number: 5,022,807
[45] Date of Patent: * Jun. 11, 1991

[54] DEPOSITORY FOR ACCUMULATIONS OF PAPER SHEETS

[75] Inventor: Heinz Linder, Zofingen, Switzerland

[73] Assignee: Grapha-Holding Ag, Hergiswil, Switzerland

[*] Notice: The portion of the term of this patent subsequent to Jun. 21, 2005 has been disclaimed.

[21] Appl. No.: 179,038

[22] Filed: Apr. 8, 1988

Related U.S. Application Data

[63] Continuation of Ser. No. 826,286, Feb. 5, 1986, Pat. No. 4,752,176.

[30] Foreign Application Priority Data

Feb. 7, 1985 [CH] Switzerland ............................. 550/85

[51] Int. Cl.$^5$ ............................................. B65G 1/133
[52] U.S. Cl. .................................. 414/278; 242/58.6; 414/279; 414/286; 414/911
[58] Field of Search ......................... 414/277–280, 414/282, 286, 911; 242/58.6, 59, 79

[56] References Cited

U.S. PATENT DOCUMENTS

| | | | |
|---|---|---|---|
| 3,507,406 | 4/1970 | Zollinger | 414/278 |
| 3,695,539 | 10/1972 | Lindstaedt | 242/79 X |
| 3,792,785 | 2/1974 | Weir | 414/278 |
| 3,877,653 | 4/1975 | Foltyn et al. | 242/79 X |
| 3,978,995 | 9/1976 | Zollinger et al. | 414/279 |
| 4,239,436 | 12/1980 | Wildenaur | 414/278 X |
| 4,450,400 | 5/1984 | Gwyn | 414/278 X |
| 4,494,705 | 1/1985 | Linder | 242/59 |
| 4,523,751 | 6/1985 | Merkli | 270/60 |
| 4,526,362 | 7/1985 | Thierstein | 242/67.3 R |
| 4,528,794 | 7/1985 | Thierstein | 242/59 X |
| 4,538,397 | 9/1985 | Boss | 242/59 X |
| 4,550,883 | 11/1985 | Boss | 242/59 |
| 4,752,176 | 6/1988 | Linder | 414/278 |

FOREIGN PATENT DOCUMENTS

| | | | |
|---|---|---|---|
| 135080 | 3/1985 | European Pat. Off. | |
| 56-402 | 5/1981 | Japan | 414/280 |
| 261945 | 12/1926 | United Kingdom | 414/282 |
| 831636 | 3/1960 | United Kingdom | |
| 1202362 | 8/1970 | United Kingdom | |
| 1204044 | 9/1970 | United Kingdom | |
| 1249481 | 10/1971 | United Kingdom | |
| 1360726 | 7/1974 | United Kingdom | |
| 1381565 | 1/1975 | United Kingdom | |
| 1395613 | 5/1975 | United Kingdom | |
| 2052456 | 1/1981 | United Kingdom | 414/279 |
| 2080265 | 2/1982 | United Kingdom | |
| 2094770 | 9/1982 | United Kingdom | 414/277 |

Primary Examiner—David A. Bucci
Attorney, Agent, or Firm—Peter K. Kontler

[57] ABSTRACT

Large rolls of partially overlapping paper sheets which are convoluted onto the cores of reels are stored in one or more rows of compartments in a newspaper printing or bookbinding plant. Two adjoining rows are separated from each other by a track for one or more vehicles which are used to transport empty reels to one or more compartments wherein the sheets are convoluted onto the respective cores as well as to transport loaded reels to unoccupied compartments or to compartments which are adjacent to unwinding units. Conveyors in the form of cranes and/or chain or belt conveyors are used to transfer empty and loaded reels between the compartments of the rows and pairs of similar compartments on the vehicles. A vehicle which transports a loaded reel from the convoluting station to an empty compartment is used to transport an empty reel from such compartment to the compartment at the convoluting station so that the vehicle is put to use during each stage of its movement.

14 Claims, 1 Drawing Sheet

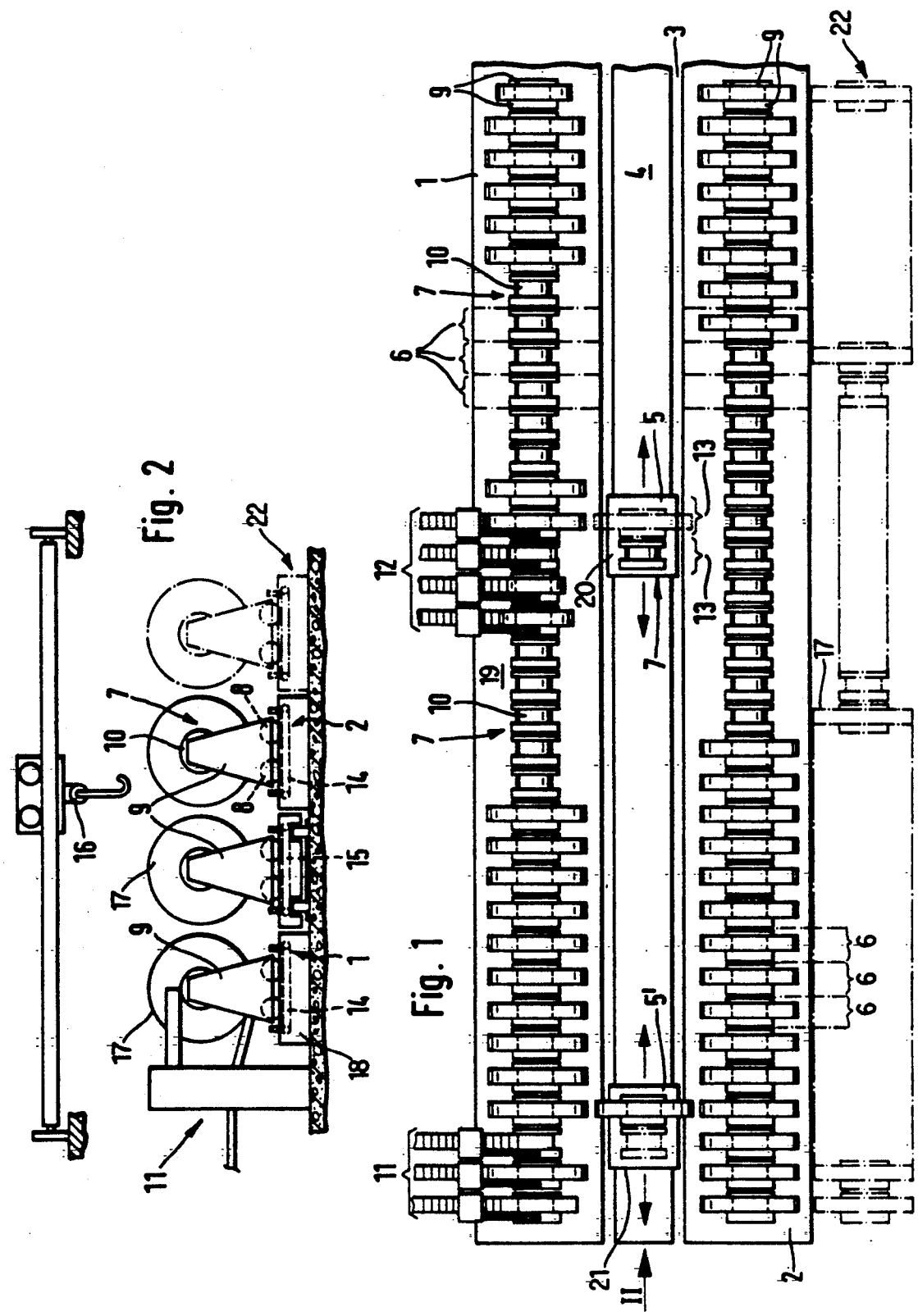

DEPOSITORY FOR ACCUMULATIONS OF PAPER SHEETS

CROSS-REFERENCE TO RELATED CASE

This is a continuation of copending patent application Ser. No. 826,286 filed Feb. 5, 1986 for "Depository for accumulations of paper sheets", now U.S. Pat. No. 4,752,176 granted June 21, 1988.

BACKGROUND OF THE INVENTION

The present invention relates to depositories or magazines for temporary storage of accumulations of paper sheets or the like More particularly, the invention relates to improvements in depositories for large accumulations of sheets or like commodities, particularly for large pallets which carry stacks of folded paper sheets or for large rolls of convoluted folded paper sheets.

It is well known to palletize folded sheets or signatures which are used in bookbinding or newspaper printing plants and to utilize the pallets (each of which has a standard size) for transport of stacked sheets to storage, from storage or directly from the stacking station to a processing station. It is also known to temporarily store large numbers of sheets in the form of rolls each of which is convoluted onto the core of a bobbin or reel and which are put to storage for certain periods of time prior to delivery to a gathering, stuffing, inserting or other processing machine. As a rule, the cores of the reels are mounted in frames which can be transported in the plant to and from storage and/or to other locations in lieu of standard pallets.

A drawback of presently known depositories for pallets and reels which carry large quantities of sheets in the form of stacks or in the form of convolutions is that the vehicles which are used to deliver pallets or reels to and from storage and/or to other destinations are empty at least half of the time. Thus, if the vehicle is used to transport one or more pallets or reels from the stacking or convoluting station to storage, it is empty on its way from storage back to the stacking or convoluting station. Analogously, if the vehicle is used to transport one or more pallets or reels from storage to a gathering or inserting machine, it is empty on its way back to storage or to the stacking or convoluting station. Moreover, the space in a factory building or the like is not utilized to capacity when the pallets or reels are transported in the just described manner. The proposals to increase the number of vehicles do not constitute a satisfactory solution because of the higher initial and maintenance cost as well as the need for additional space in the plant in order to allow for movement of numerous vehicles to and from storage and/or other destinations.

OBJECTS AND SUMMARY OF THE INVENTION

An object of the invention is to provide a novel and improved depository for large accumulations of paper sheets or the like, especially for accumulations in the form of rolls of partially overlapping paper sheets which are convoluted onto the cores of bobbins, reels or like carriers.

Another object of the invention is to provide a depository wherein a small number of vehicles suffices to transport large numbers of accumulations to and from storage as well as from the accumulating station or stations and/or to one or more withdrawing or breaking up stations.

A further object of the invention is to provide a depository wherein each vehicle can be put to use on its way toward as well as away from a selected location.

Still another object of the invention is to provide a novel and improved method of manipulating large accumulations of sheets in a newspaper printing, bookbinding or like plant.

An additional object of the invention is to provide novel and improved facilities for temporary storage of large accumulations of paper sheets in a depository of the above outlined character.

A further object of the invention is to provide a novel and improved distribution of storage facilities in a depository of the above outlined character.

Another object of the invention is to provide novel and improved vehicles and other types of conveyors for use in the above outlined depository.

An additional object of the invention is to provide a depository which can be utilized with a heretofore unmatched degree of economy, not only for temporary storage of large accumulations of printed sheets but also for rapid delivery of such accumulations into and/or rapid removal of accumulations from storage.

One feature of the present invention resides in the provision of a depository for accumulations of sheets, particularly for pallets which are loaded with stacks of paper sheets or for rolls of convoluted paper sheets. The depository comprises at least one row of neighboring first facilities for temporary storage of discrete accumulations, an elongated track extending along the row of first facilities, at least one vehicle which is arranged to move along the track and has at least two second facilities for temporary storage of discrete accumulations, and conveyor means for effecting the transport or transfer of accumulations between the first facilities of the row and the second facilities of the vehicle. The row is preferably (but need not always be) a straight row, and the track is preferably parallel with and can be closely adjacent to one side of the row.

The depository can further comprise at least one second or additional row of neighboring first facilities for temporary storage of accumulations. The track is then disposed between and is flanked by the at least one row at one side and the second row or rows at the other side. The conveyor means then preferably comprises means for effecting the transport or transfer of accumulations between the first facilities of each second row and the second facilities of the vehicle.

The depository can further comprise means for accumulating sheets in at least one of the first facilities of the at least one row, and such row is preferably disposed between the accumulating means and the track. The depository can further comprise means for removing sheets from an accumulation in at least one first facility of the at least one row, and such row is preferably disposed between the track and the removing means.

Each of the first facilities preferably includes a first support (e.g., a base or platform) which serves to locate an accumulation in the respective first facility at a predetermined level. The vehicle is movable along the track to place its second facilities into register with selected first facilities of the at least one row, and each second facility preferably includes a second support (e.g., a platform or base) which serves to locate an accumulation therein at the level of the registering first facility The conveyor means of such depository can comprise rollers which are provided on the accumulations (e.g., on the frames for the cores on which streams of partially overlapping paper sheets are convoluted) so that such accumulations can be simply rolled from a second support onto the registering first support or vice versa.

As mentioned above, the depository can comprise two or more second or additional rows of first facilities, and the vehicle or vehicles which are movable along the track can be arranged or used to transport accumulations longitudinally of the rows, e.g., from a second row to a selected first facility of the at least one row so that the thus transferred accumulation is in the range of the aforementioned removing means.

The depository can comprise a plurality of discrete vehicles (e.g., in the form of rail-mounted carriages) each of which can be moved (either by hand or by a prime mover) along the track (e.g., along a pair of rails) independently of each other vehicle.

The conveyor means can comprise an endless chain or belt conveyor for each of the first and second facilities. Alternatively, or in addition to such endless belt or chain conveyors, the conveyor means can comprise an overhead crane which can transfer accumulations between the first facilities and the second facilities or between different first facilities.

The mutual positions of the second facilities on each vehicle are preferably selected in such a way that one second facility registers with a selected first facility of the adjacent row when the other second facility registers with the first facility which is immediately adjacent to the selected first facility. The dimensions of each first facility can match the dimensions of each second facility.

Another feature of the invention resides in the provision of a method of manipulating accumulations of sheets, particularly pallets with stacks of sheets or rolls of convoluted paper sheets. The method comprises the steps of establishing at least one row of neighboring facilities or sections for temporary storage of accumulations in a magazine or depository, forming a succession of accumulations in at least one section of the row of neighboring sections, transferring each freshly formed accumulation into another section of the row, and breaking up the accumulation in the other section of the row. The transferring step includes establishing for the accumulations an elongated path or track extending along the row of sections, conveying the freshly formed accumulation from the one section into the adjacent portion of the path, advancing the accumulation along the path to a position adjacent to the other section of the row, and conveying the accumulation from the path into the other section of the row.

The method can further comprise the steps of maintaining a carrier (such as the aforementioned frame or pallet) for an accumulation of sheets in each section of the row and maintaining at least one spare carrier in the path. The forming step then includes storing a plurality of sheets on the carrier in the one section, and the transferring step then includes moving the thus loaded carrier into and along the path and into the other section. Such method further comprises the steps of introducing the spare carrier into the one section upon removal of the loaded carrier, and withdrawing the carrier from the other section into the path prior to insertion of the loaded carrier so that the thus withdrawn carrier then constitutes the spare carrier.

The forming step can include convoluting a (scalloped) stream of partially overlapping sheets onto the carrier in the one section, and the step of breaking up can comprise unwinding the stream from the loaded carrier in the other section.

The method can further comprise the steps of establishing a second row of neighboring sections adjacent to the path so that the path is flanked by the two rows of sections, and transferring some of the accumulations from the one section into the path and thence into selected sections of the second row. Such method can further comprise the step of transferring accumulations from the sections of the second row (wherein the accumulations are stored for desired intervals of time) into the other section so that the thus transferred accumulations can be broken up.

The novel features which are considered as characteristic of the invention are set forth in particular in the appended claims. The improved depository itself, however, both as to its construction and the mode of manipulating accumulations of sheets therein, will be best understood upon perusal of the following detailed description of certain specific embodiments with reference to the accompanying drawing.

BRIEF DESCRIPTION OF THE DRAWINGS

FIG. 1 is a schematic plan view of a depository which embodies the present invention; and FIG. 2 is a schematic end elevational view as seen in the direction of arrow II from the left-hand side of FIG. 1.

DESCRIPTION OF THE PREFERRED EMBODIMENTS

The drawing shows a depository wherein an elongated straight track or path 3 is flanked by two straight elongated parallel rows 1 and 2 of neighboring first facilities or sections 6 for temporary storage of discrete accumulations 17 of paper sheets. In the illustrated embodiment, each of the accumulations 17 constitutes a converted scalloped stream of partially overlapping folded sheets which are convoluted on the core 10 of a suitable carrier or frame 7 further including two spaced-apart sidewalls or cheeks 9. The track 3 is provided with one or more elongated rails 4 for one or more independently movable vehicles. FIG. 1 shows two vehicles 5 and 5' each of which can constitute a wheel-mounted carriage adapted to move each of its two closely adjacent second facilities or sections 13 into register with a selected facility or section 6 of the row 1 or 2. Each of the facilities 6 can comprise a support or base 18, and such supports or bases together constitute an elongated platform 19 which is designed to maintain the accumulations 17 thereon at a predetermined level. Each of the second facilities 13 also comprises a support or base 20, and such supports or bases together constitute a platform 21 which is designed to maintain the accumulations 17 thereon at the predetermined level so as to allow for convenient transport or transfer of accumulations from a facility 13 into or onto a facility 6 or vice versa. The dimensions of each facility 13 can approximate or match those of a facility 6.

Each of the frames 7 is preferably mounted on rollers or wheels 8 (hereinafter called rollers with the understanding that this term is intended to embrace wheels, rollers, casters, skids and like parts which facilitate the shifting of relatively heavy accumulations 17 between the supports 18 and the adjacent supports 20). The manner in which the streams of sheets are convoluted onto the cores 10 of the frames 7 by each of a battery of three accumulating or winding units 11 forms no part of the present invention. Reference may be had, for example, to the commonly owned European patent application No. 84 109 005.3 or to the commonly owned U.S. Pats. Nos. 4,523,751, 4,526,362, 4,494,705, 4,538,397, 4,550,883 and 4,528,794.

The depository further comprises a battery of, for example, four sheet removing or withdrawing units 12 which serve to unwind the streams of partially overlapping sheets from the respective cores 10, e.g., in a manner as disclosed in the aforementioned commonly owned U.S. Pat. No. 4,550,883. It will be noted that the row 1 of facilities 6 is disposed between the path 3 and the units 11, 12; this ensures that each of the units 11, 12 is readily accessible as well as that scalloped streams of sheets can be readily delivered to the units 11 and withdrawn from the units 12. The aforementioned European patent application also describes devices which can be used as accumulating units 11 and withdrawing units 12 in the depository of FIGS. 1 and 2. For example, each unit 11 can receive a scalloped stream of sheets from a sheet folding station, and each unit 12 can deliver sheets to a gathering, stuffing or inserting machine in a bookbinding or newspaper printing and assembling plant.

The depository further comprises conveyor means for effecting the transfer or transport of accumulations 17 between the facilities 6 of the row 1 or 2 and the facilities 13 of the vehicles 5, 5'. Such conveyor means can comprise a discrete endless chain or belt conveyor 14 for each of the facilities 6 and a discrete chain or belt conveyor 15 for each of the facilities 13, and such discrete conveyors can be driven by motors (not specifically shown) which are started and arrested manually or automatically, e.g., in accordance with a selected program.

The chain or belt conveyors 14 and 15 can be used jointly with or in lieu of an overhead crane 16 which preferably includes one or more trolleys movable transversely of and/or longitudinally of the track or path 3.

An additional row 22 of facilities 6 is shown in FIG. 1 adjacent to the row 2 so that the latter is disposed between the row 22 and the track 3. The accumulations 17 which are stored in the facilities 6 of the row 22 can be transferred first into the adjacent facilities of the row 2 and thence onto one of the vehicles 5, 5' and vice versa. Alternatively, the crane 16 can be used to transport accumulations 17 directly from the facilities 6 which are adjacent the accumulating units 11 to selected facilities 6 of the row 22 and from such facilities of the row 22 directly to the facilities 6 which are adjacent to the withdrawing units 12.

The depository of FIGS. 1 and 2 can be operated as follows:

An empty frame 7 in one of the facilities 6 (of the row 1) which are adjacent to the accumulating units 11 can be provided with a supply of sheets so that such frame is converted into a loaded frame or support carrying a roll or accumulation 17 of partially overlapping sheets. The neighboring convolutions of such sheets are separated from each other by the convolutions of a preferably elastic band in a manner as disclosed in the aforementioned commonly owned U.S. Pat. No. 4,550,883. The vehicle 5' is then moved along the rails 4 so as to place an unoccupied facility 13 into register with the facility 6 wherein the frame 7 supports an accumulation 17. The corresponding conveyor 14 is then set in motion to transfer the frame 7 and the accumulation 17 thereon into the adjacent facility 13. The vehicle 5' is advanced by a step so as to place the empty frame 7 in its other facility 13 into register with the freshly evacuated facility 6 of the row 1, and the respective conveyor 15 is then set in motion to transfer the empty frame 7 from the vehicle 5' into the adjacent facility 6 where the empty frame is ready to receive an accumulation 17 from the respective unit 11. The vehicle 5' is moved along the path 3 to place its empty facility 13 into register with the empty frame 7 of a facility 6 in the row 1 or 2, and the respective conveyor 14 is set in motion to transfer the empty frame 7 from such facility 6 into the theretofore empty facility 13 of the vehicle 5'. The vehicle 5' is again moved by a step so as to place the facility 13 containing the freshly loaded frame 7 into register with the freshly emptied facility 6, and the respective conveyor 15 is started to transfer the loaded frame 7 from the vehicle 5' into the row 1 or 2. If desired or necessary, the loaded frame 7 in one of the facilities 13 can be moved immediately into register with the facility 6 which is adjacent to one of the withdrawing units 12. This depends upon whether the units 11 and 12 are operated simultaneously or the units 11 are operated first to form a given number of filled frames 7 (each of which is provided with a roll or accumulation 17 of partly overlapping sheets) which are then stored in the facilities 6 of the row 1, 2 and/or 22 for a certain interval of time prior to being transported into the facilities 6 which are adjacent to the units 12 so that such units can unwind the streams of sheets for admission into gathering, stuffing, inserting or other processing machines, not shown.

It will be seen that one facility 13 of the vehicle 5' contains an empty (spare) frame 7 while the vehicle 5' is on its way toward one of the units 11 while the other facility 13 is unoccupied so that it can receive a freshly loaded frame 7 before the spare frame 7 is transferred from the vehicle 5' into the freshly emptied facility 6 adjacent to one of the units 11. On its way away from the units 11, the vehicle 5' carries a loaded frame 7 (with an accumulation 17 of sheets thereon) and an empty facility 13 so that the latter can receive an empty frame 7 from the facility 6 which is to receive the loaded frame 7.

The manner of utilizing the vehicle 5 is identical with or analogous to that of using the vehicle 5'. It is clear that the depository can employ a single vehicle or more than two vehicles, depending on the number of facilities 6 and the permissible length of intervals which are required to transfer empty frames 7 to the units 11 and loaded frames 7 from the units 11 to the units 12 or to selected facilities 6.

The improved depository is susceptible of numerous additional modifications. For example, the number of rows of facilities 6 at the right-hand side of the track 3, as viewed in FIG. 2, can be increased to three or more, depending on the desired overall number of facilities 6 and on the dimensions of the edifice (e.g., a building in a newspaper printing and assembling plant) wherein the improved depository is put to use. The number of facilities 13 on each of the vehicles 5, 5' is preferably increased if the number of rows with facilities 6 is increased. For example, the number of facilities 13 on each vehicle can match the total number of rows of facilities 6 minus one.

Accumulating units and withdrawing units which can be used in the depository of the present invention are disclosed in numerous additional patents and pending applications of the assignee.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A depository for accumulations of sheets, particularly for rolls of convoluted paper sheets, comprising at least one row of neighboring first facilities for temporary storage of discrete accumulations; mobile carriers for accumulations in said first facilities, there being a discrete carrier in each of said facilities; an elongated track extending along said row; means for accumulating sheets on the carrier in at least one of said first facilities; means for removing sheets from the accumulation on the carrier in at least one of said first facilities; at least one vehicle arranged to move along said track and having at least two second facilities for temporary storage of discrete accumulations; a mobile carrier for an accumulation in at least one of said second facilities so that at least one of said second facilities is occupied whenever said vehicle travels along said row, said carries being transferable between the respective first and second facilities; and conveyor means for effecting the transport of carriers between the first facilities of said row and the second facilities of said vehicle substantially transversely of said track.

2. The depository of claim 1, wherein said row is a straight row and said track is parallel to said row.

3. The depository of claim 1, further comprising a second row of neighboring first facilities for temporary storage of discrete accumulations and carries for accumulations in the first facilities of said second row, said track being disposed between and being flanked by said rows, said conveyor means including means for effecting the transport of carriers between the first facilities of said second row and the second facilities of said vehicle.

4. The depository of claim 1, wherein said row is disposed between said track and said accumulating means.

5. The depository of claim 1, wherein said row is disposed between said track and said removing means.

6. The depository of claim 1, wherein each of said first facilities includes a first support arranged to locate the carrier therein at a predetermined level and said vehicle is movable along said track to place its second facilities into register with selected first facilities of said row, each of said second facilities including a second support arranged to locate a carrier therein at the level of the carrier on the registering first support.

7. The depository of claim 6, wherein said conveyor means includes rollers provided for the carriers so that such carriers can be rolled from a second support onto the registering first support or vice versa.

8. The depository of claim 1, further comprising several additional rows of first facilities for temporary storage of discrete accumulations and carriers for accumulations in the first facilities of said additional rows, said track being disposed between said at least one row and said additional rows and said conveyor means including means for effecting the transport of carriers between the first facilities of said additional rows and the second facilities of said vehicle.

9. The depository of claim 1, comprising a plurality of discrete vehicles each arranged to move along said track independently of each other vehicle.

10. The depository of claim 1, wherein said conveyor means comprises an endless belt or chain conveyor for each of said facilities.

11. The depository of claim 1, wherein said conveyor means comprises an overhead crane.

12. The depository of claim 1, wherein the mutual positions of said second facilities are such that one thereof registers with a selected first facility when the other second facility registers with the first facility which is immediately adjacent to the selected first facility.

13. The depository of claim 12, wherein the dimensions of said first facilities match the dimensions of said second facilities.

14. A depository for articles, comprising at least one row of neighboring first facilities for temporary storage of respective articles; at least one vehicle arranged to move along said row and having at least two second facilities for temporary storage of respective articles; guide means for guiding said vehicle along said row; mobile carriers for the articles transferable between the respective first and second facilities, said carriers including a carrier in at least one of said second facilities so that at least one of said second facilities is occupied whenever said vehicle travels along said row; and conveyor means for effecting the transport of carriers between said first facilities and said second facilities.

* * * * *